C. S. PELTON.
HEATER FOR MOTOR PROPELLED VEHICLES.
APPLICATION FILED DEC. 6, 1916.
1,309,216.
Patented July 8, 1919.
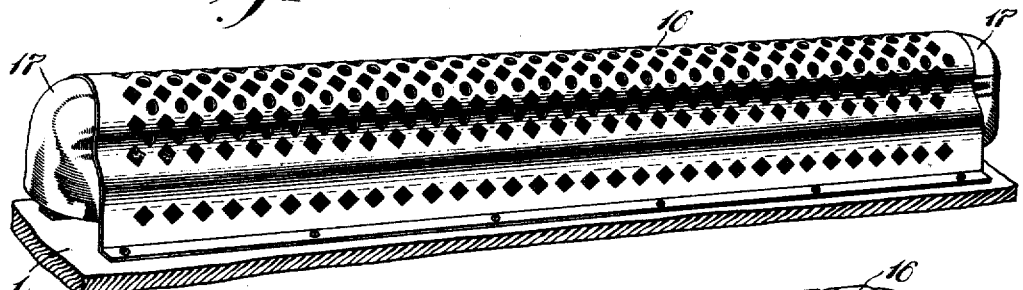
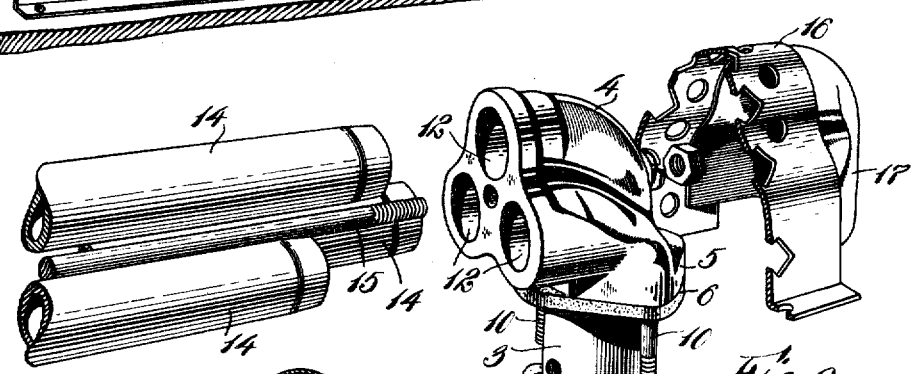
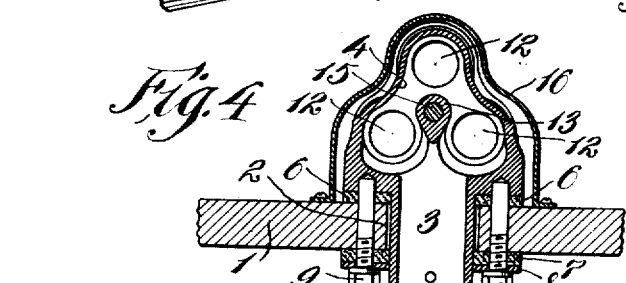
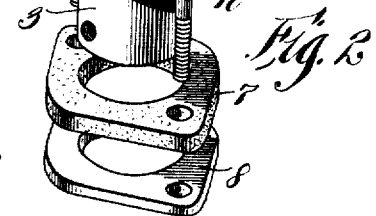
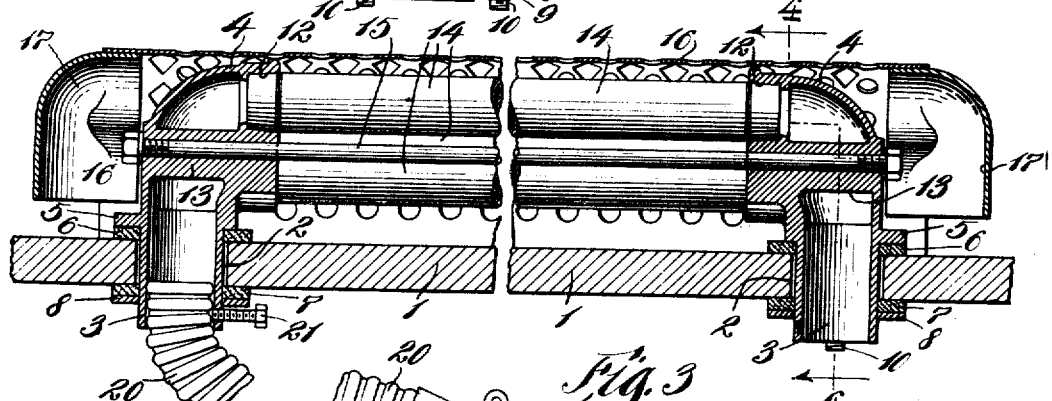
Inventor
Clyde S. Pelton
By Hull, Smith, Brock & West
Attys.

UNITED STATES PATENT OFFICE.

CLYDE S. PELTON, OF CLEVELAND HEIGHTS, OHIO, ASSIGNOR, BY MESNE ASSIGNMENTS, TO THE PERFECTION HEATER & MANUFACTURING COMPANY, OF CLEVELAND, OHIO, A CORPORATION OF OHIO.

HEATER FOR MOTOR-PROPELLED VEHICLES.

1,309,216.  Specification of Letters Patent.  Patented July 8, 1919.

Application filed December 6, 1916. Serial No. 135,299.

*To all whom it may concern:*

Be it known that I, CLYDE S. PELTON, a citizen of the United States, residing at Cleveland Heights, in the county of Cuyahoga and State of Ohio, have invented a certain new and useful Improvement in Heaters for Motor-Propelled Vehicles, of which the following is a full, clear, and exact description, reference being had to the accompanying drawings.

This invention relates to heaters for motor propelled vehicles whereby a portion of the exhaust gases from the gasolene engine are diverted through a suitable fitting in the passenger compartment for the purpose of warming the air therein.

The objects of the invention are the provision of a heater of maximum heating efficiency and minimum obstruction to the movement of the gases; the provision of a combined heater and foot-rest of compact construction, and high radiating efficiency; the provision of a foot-rest type of heater which shall be less susceptible to denting and bruising than prior devices; the provision of a cheap and simple, leak-proof and noiseless heater; while further objects and advantages will become apparent as the description proceeds.

In the drawings accompanying and forming a part of this application, I have illustrated one embodiment of my invention, although it will be understood that many modifications in construction and arrangement could be resorted to without departing from the scope of my inventive idea or losing the benefits to be derived therefrom. In these drawings, Figure 1 is a perspective view of the device as it appears in operation; Fig. 2 is a separated perspective view of a part of the device shown in Fig. 1; Fig. 3 is a longitudinal, vertical, sectional view through the device shown in Fig. 1 together with the exhaust and branch pipes; and Fig. 4 is a transverse sectional view taken upon the broken line 4—4 of Fig. 3 and looking in the direction of the arrows.

Describing the parts by reference characters, 1 represents a part of the automobile floor through which holes 2 are formed for the reception of my improved heater. Through each of these holes is projected the elongated nipple 3 of a right-angle fitting 4 shown in perspective in Fig. 2. The upper end of this nipple is defined by a flange 5, below which is located a gasket 6, and said nipple is secured in the floor by means of a second gasket 7 and collar 8, the latter being secured in place in a suitable manner as by nuts 9 engaging the bolts 10 cast in the flange 5.

The body of the fitting 4 above the floor is formed with three laterally turned sockets 12—12 whose axes are parallel to each other but perpendicular to that of the nipple 3, the webs between adjacent sockets merging with a hollow boss 13. This boss is preferably of oval cross-section with its extended portion depending between the lowermost sockets which are arranged side by side horizontally. Two of these fittings are employed in each heater with their sockets turned toward each other and the bosses 13—13 in alinement, the sockets receiving the slightly tapered extremities of the tubes 14—14 and the bosses receiving the tie bolt 15 whereby the fittings are clamped to the end of the tubes. The interior of each of the fittings 4—4 is hollow, each of the sockets 12—12 being in free communication with the nipple 3. The boss 13 forms a deflector and tends to equalize the distribution of the gases between the three tubes while also preventing leakage around the bolts.

The whole device thus far described forms a radiator of small size and compact form, whose radiating effect is increased by covering the tubes 14—14 with a black conducting coating such for example as formed by phosphoric acid treatment. This radiator is then covered with a perforated sheet metal housing preferably of the type shown, since the shape and conformation illustrated embraces closely the surface of the pipes and affords the proper angle for a foot rest and, because of the longitudinally corrugated construction, is peculiarly resistant to denting or deformation, although I do not restrict myself to this form. Likewise I do not confine myself to the shape and arrangement of apertures shown in the casing 16, although my experience indicates that the combination of squares and circles indicated herein affords a larger amount of strength for a given amount of opening than any other. The ends of this housing are formed of rounded sheet metal pieces 17, 17 conforming in shape to the body of the housing and rigidly secured thereto as by riveting or welding so as to prevent collapse thereof. For attaching this heater to the exhaust pipe I preferably employ a flexible metallic tube 20, secured to one of the nipples 3 in any convenient manner as by being merely inserted therein and secured by a set screw 21. The opposite end of this flexible tube is clamped within the side branch of a valved connection 22, which is clamped upon the exhaust pipe 23 at any convenient place.

The particular construction of the valve fitting is entirely immaterial as regards this invention, as is also the direction of attaching the device. The heater being symmetrical in all its parts and members, and the nipples 3—3 being equally adapted for the reception of the branch pipe, it will be seen that either end of the heater can be connected to the exhaust pipe depending upon whether the exhaust pipe lies at one or the other side of the vehicle or depending upon the number of obstructions adjacent thereto. This flexible tubing forms, in effect, an elbow, which can be reversed or changed in direction at will.

In order to secure quick and efficient heating it is necessary that the hot gases be delivered through the heater pipes with the greatest possible speed, since the rate of interchange of heat between the gases and the pipes, increases with the fifth power of the absolute temperature; and this rapidity of circulation must be secured entirely by the freedom of the passage through the heater and not by obstructing the main exhaust pipe in any degree since that would involve placing an extra load upon the engine which propels the vehicle. Therefore it is essential to employ a heater having no return bends and the smallest possible number of sharp angles, and preferably having provision therein for an expansion of the hot gases immediately upon their admission to the heater and with no requirement for contraction until they have become thoroughly cooled. This result I attain by making the cross-sectional area of the three tubes 14—14 considerably greater than the cross sectional area of the nipples 3—3, so that at the hot end the gases can expand quickly, the corresponding reduction of the outlet being unimportant since the gas pressure will have become greatly reduced by the time the impulses reach this point owing to the very rapid radiation. This is accomplished by the large surface area of the tubes, by making them thin walled, preferably about 20 gage steel or copper tubing, and by a surface treatment to facilitate radiation as already described. The triangular arrangement of the tubes also provides with peculiar convenience for the reception of the tie bolt. However it will be understood that many other constructions and arrangements could be employed within the scope of my invention, wherefore I do not restrict myself to the details of construction or arrangement herein illustrated except as the same are specifically recited in the claims hereto annexed or rendered necessary by the prior state of art.

Having thus described my invention, what I claim is:—

1. In a heater for motor propelled vehicles, a pair of end fittings each comprising a hollow nipple and three sockets whose axes are perpendicular to said nipple, said sockets being arranged at the apices of an equilateral triangle whose base is perpendicular to said nipple and all of said sockets being in free communication with the nipple interior, three heating pipes connecting said fittings and having their ends received in corresponding sockets, and a tie bolt connecting said fittings and drawing the same upon said pipes.

2. In a heater for motor propelled vehicles, a pair of end fittings each comprising a hollow nipple and three sockets whose axes are perpendicular to said nipple, said sockets being arranged at the apices of an equilateral triangle whose base is perpendicular to said nipple and all of said sockets being in free communication with the nipple interior, three heating pipes connecting said fittings and having their ends received in corresponding sockets, means securing said fittings upon the ends of said pipes, and a perforated sheet metal housing covering said pipes and conforming generally to the contour thereof.

In testimony whereof, I hereunto affix my signature.

CLYDE S. PELTON